United States Patent [19]
Keller

[11] Patent Number: 4,722,128
[45] Date of Patent: Feb. 2, 1988

[54] LOADING TOOL

[75] Inventor: Hans R. Keller, Concord, Calif.

[73] Assignee: The Dow Chemical Company, Midland, Mich.

[21] Appl. No.: 894,413

[22] Filed: Aug. 8, 1986

[51] Int. Cl.⁴ .................................. B23P 19/04
[52] U.S. Cl. .................................. 29/234; 29/267
[58] Field of Search ............ 29/234, 237, 267, 282; 254/251, 256, 131; 75/705

[56] References Cited

U.S. PATENT DOCUMENTS

| | | | |
|---|---|---|---|
| 798,133 | 8/1905 | Green et al. | |
| 868,952 | 11/1907 | White | |
| 1,317,145 | 9/1919 | Skantz | |
| 2,432,209 | 7/1947 | Storey | |
| 2,698,161 | 12/1954 | Kirby, Sr. | |
| 2,793,424 | 5/1957 | Witte | 29/267 X |
| 2,881,515 | 4/1959 | Schoer | 29/267 |
| 2,947,073 | 8/1960 | Boyer | 29/267 X |
| 3,048,368 | 8/1962 | Linabery, Sr. | |
| 3,091,983 | 6/1963 | Kliss | 254/131 X |
| 3,319,455 | 5/1967 | Armstrong, Jr. | 72/705 X |
| 3,585,703 | 6/1971 | Goss | 29/237 |
| 3,688,378 | 9/1972 | Garvey | 29/237 |
| 3,919,932 | 11/1975 | Basuino | |
| 3,927,457 | 12/1975 | Bickle | 29/237 |
| 4,061,574 | 12/1977 | Clark | |
| 4,157,809 | 6/1979 | Haller et al. | 254/131 |
| 4,250,769 | 2/1981 | Herring | |

FOREIGN PATENT DOCUMENTS

| | | | |
|---|---|---|---|
| 2109064 | 3/1980 | Fed. Rep. of Germany | 72/705 |
| 710438 | 6/1954 | United Kingdom | 72/705 |

*Primary Examiner*—Robert C. Watson

[57] ABSTRACT

A hand tool for loading an easily damaged resilient elongated object having a generally planar end into a closely fitting relatively rigid casing of conforming shape including a lever member, an elongated tension member with a member for engaging the end of the casing, a resilient compression member for placement against a planar end of the object to be moved and a universal pivot member joining the end of the lever member and the compression member for moving the object in a linear path into the pressure casing without injuring the object being moved.

5 Claims, 6 Drawing Figures

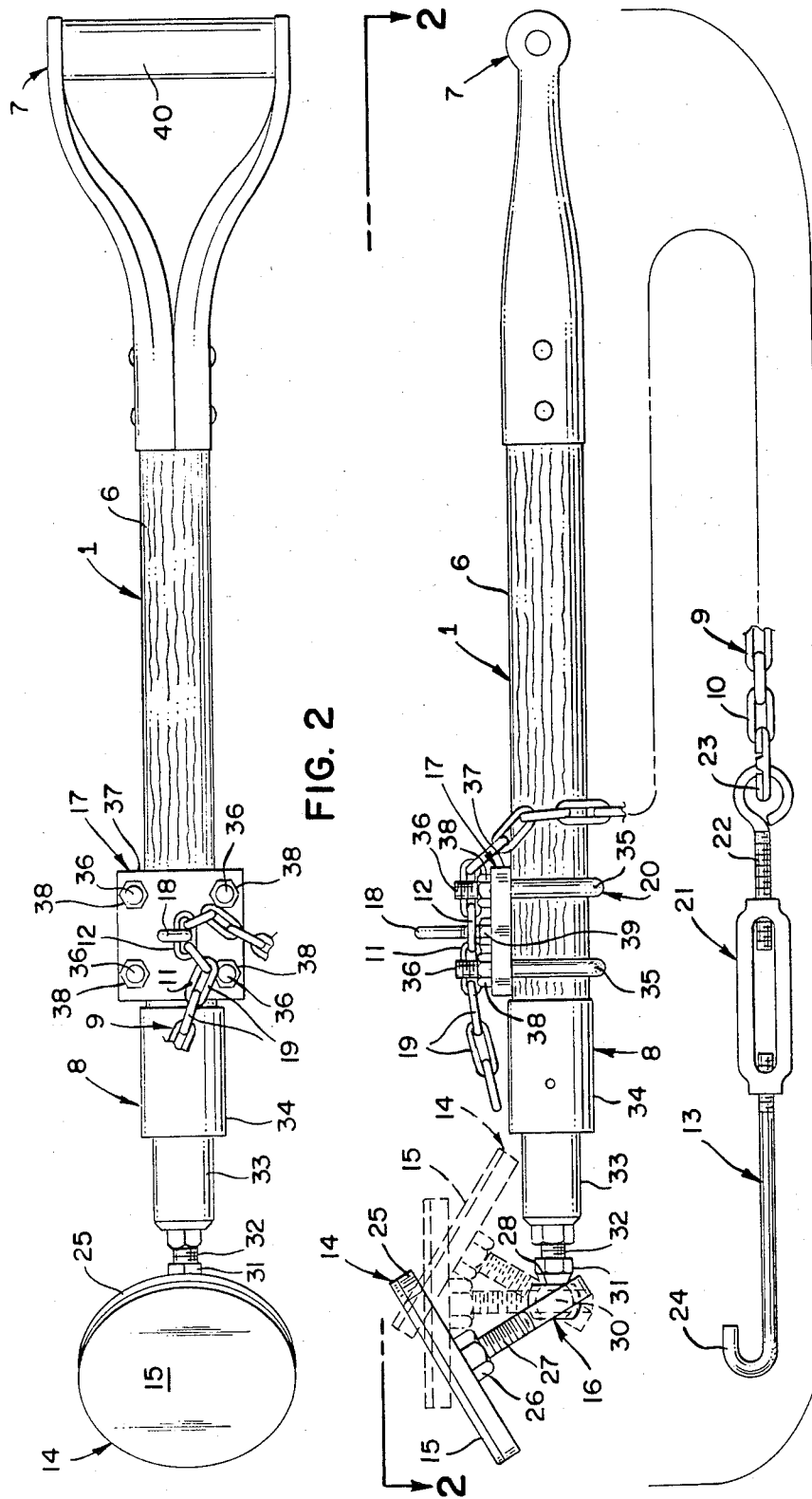

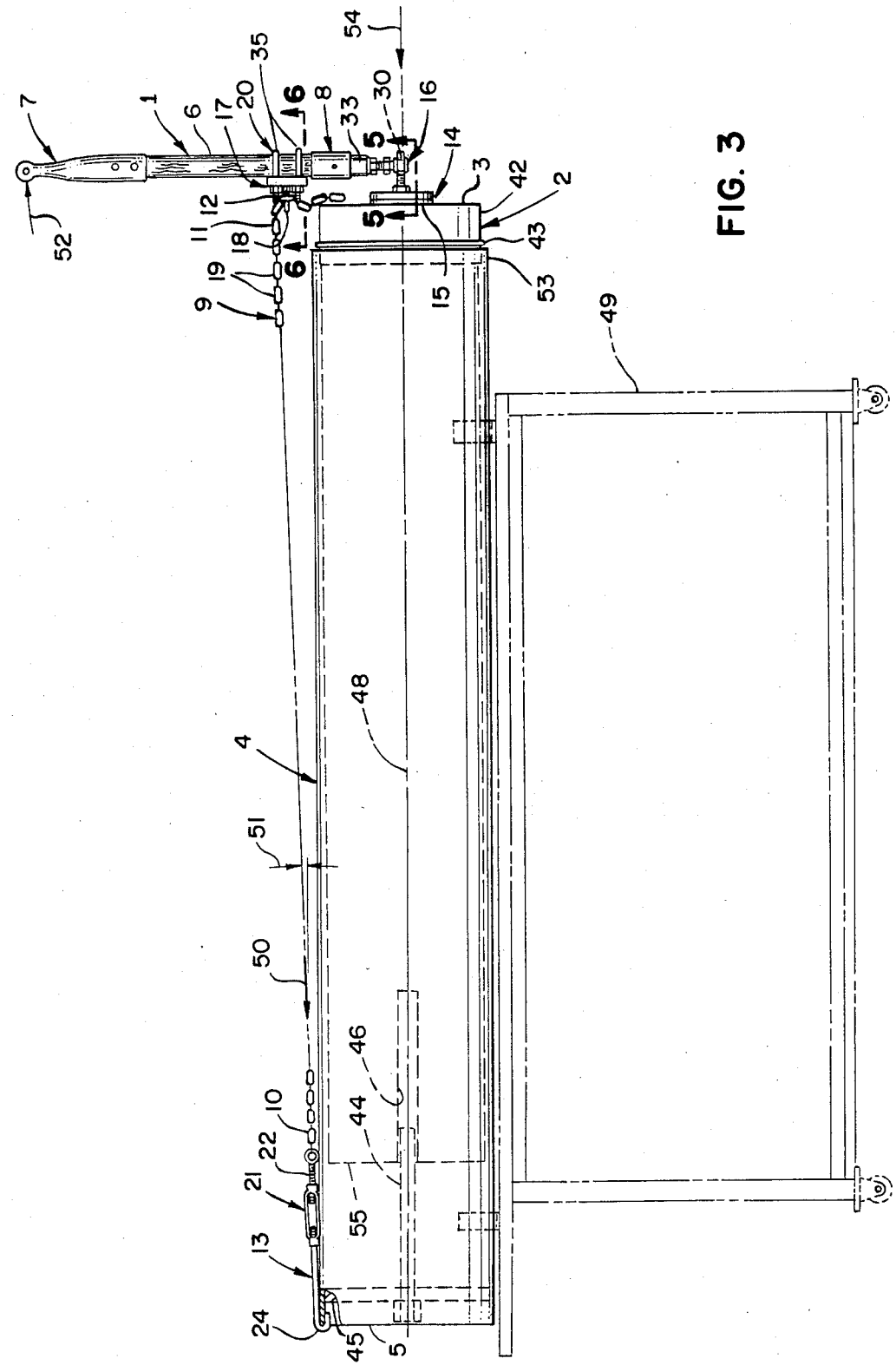

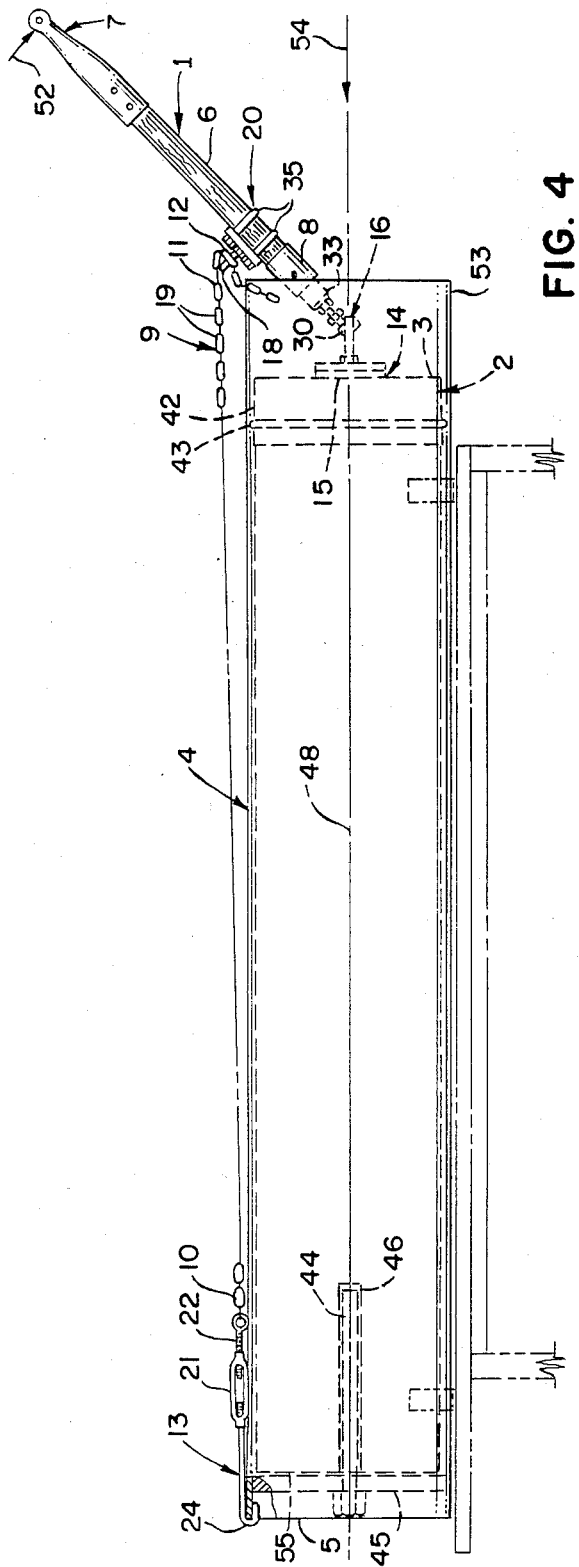
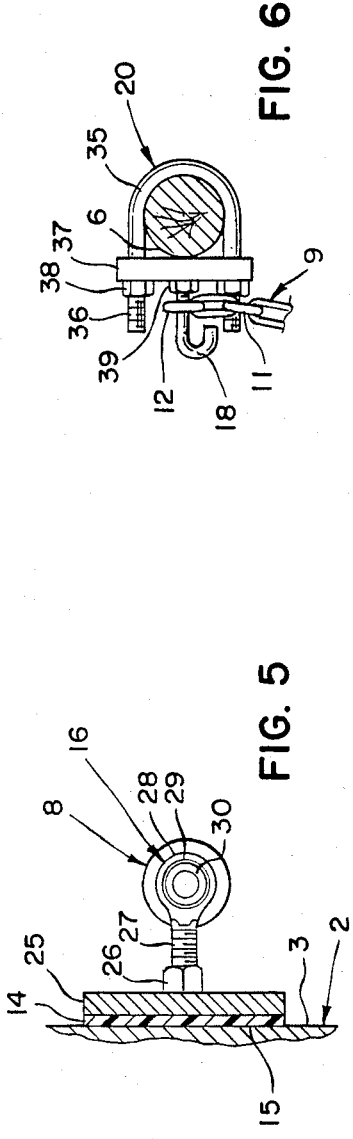
FIG. 4
FIG. 6
FIG. 5

LOADING TOOL

BACKGROUND OF THE INVENTION

This invention relates to a hand tool for applying an evenly distributed pushing force against the end of an object substantially coaxial to the longitudinal axis of the object over the distance the object is to be pushed.

One specific application of the present tool is to load easily damaged resilient elongated fiber bundle reverse osmosis permeators into closely fitting relatively rigid casings.

Reverse osmosis permeators have been used for several years to separate liquids and gases and one of the main uses is to purify water from brackish waters for boiler feeds and drinking water. The fiber bundles are from 8 to 12 inches in diameter and have a length of 3 feet or more. These fiber bundles must be removed every three to six months from the pressure casings and replaced with neely formed fiber bundles. The bundles are easily removed from the casings by simply applying fluid pressure to the closed end of the casing and literally blowing the fiber bundle out of the casing. Loading the fiber bundles, however, is more difficult since the fiber bundle is in close fitting relation with the sides of the casing. A substantial portion of the fiber bundle can be loaded into the casing by hand, but the last few inches require the application of considerable pressure against the end of the fiber bundle.

Where hydraulic jacks or screw machines are available they can be used to force the fiber bundle cartridge into the pressure vessel casing. Most workers in the field, however, load the fiber bundles by placing a board over the end and striking the board several sharp blows with a sledge hammer. The fibers in the bundle may be made from cellulose triacetate. The fibers are tiny, having an outside diameter of about 90 microns and an inside diaaeter of about 35 microns. A typical fiber bundle may contain 2 million or more fibers. These fibers have the consistency of a wet noodle and are easily damaged. Since it is impossible to hold the board on the end of a bundle and sedng a hammer so that it strikes substantially against the center every time, many of the fiber ends are damaged in the loading process. Since water must flow out the ends of these tiny fibers which are held in a "tubesheet" by a resinous material, the flow rate efficiency may be seriously affected by even the most careful workman in the loading process using the "sledgehammer" loading technique.

No tool has been found which will load the fiber bundles without damaging the ends of the fibers.

SUMMARY OF THE INVENTION

The gist of the present invention is the construction of a hand tool which is capable of applying a substantially even pressure over a substantial area of the end of an object with the force being applied substantially coaxially to the longitudinal axis of the object to be moved along substantially the entire distance the object is actually moved.

The primary object of the present invention is to provide a portable hand operated tool which will operate as above described and will not damage the object being moved.

Another object is to provide a hand tool which may be used to load fiber bundles in a casing member in reverse osmosis permeators without damaging the end fibers.

Still another object is to provide a hand tool which is relatively light weight, easily managed by a single workman and does not require the use of outside power sources.

A further object is to provide a hand tool for loading reverse osmosis permeators in which the fiber bundles are made by different processes and by different manufacturers, so that one tool can load various types of permeators.

SUMMARY DESCRIPTION OF THE DRAWINGS

FIG. 1 is a side view of a tool constructed in accordance with the present invention with portions removed to avoid duplication and with portions in phantom line to illustrate different positions of one of the elements of the device.

FIG. 2 is a bottom plan view of the device taken along line 2—2 in FIG. 1 with portions of the device removed to avoid repetitive drawings.

FIG. 3 is a side view of the device of the present invention illustrated in combination with a fiber bundle of a reverse osmosis permeator. A holding frame for the pressure casing of the permeator is shown in phantom line. The fiber bundle is shown in a position with respect to the pressure casing that it would be placed just prior to exerting a pushing force on the fiber bundle. Portions of the casing have been removed to illustrate its construction and portions of the pressure casing are shown in dotted line to further illustrate the construction of the pressure casing.

FIG. 4 is another side view of the tool shown in FIG. 3 illustrating the position of the tool when the fiber bundle is fully inserted into the pressure casing. Portions of the casing have been removed and the fiber bundle is shown in dotted line to show its position vis-a-vis the rigid casing.

FIG. 5 is an enlarged view of a portion of the tool shown in FIG. 3 taken along the line 5—5 with portions in cross section.

FIG. 6 is an enlarged view of a portion of the tool shown in FIG. 3 taken generally along the line 6—6 with portions in cross section.

DETAILED DESCRIPTION OF AN EMBODIMENT OF THE INVENTION

Referring to the drawings, the present invention is a manually operable relatively compact tool 1 for loading an easily damaged resilient elongated object 2 having a generally planar end 3 into a closely fitting relatively rigid casing 4 of conforming shape having a distal end 5, comprising:

(a) a lever member 6 having a hand engageable end 7 and a working end 8;

(b) an elongated tension member 9 having a distal end 10 and having a proximal portion 11 connected at a selected point 12 to the lever member 6 between the hand engageable end 7 and the working end 8;

(c) engaging means 13 mounted at the distal end 10 of the elongated tension member 9 for releasably engaging the distal end 5 of the casing;

(d) a resilient compression member 14 formed with a generally planar face 15 adapted for contact with the planar end 3 of the object 2; and (e) universal pivot means 16 joining the working end 8 of the lever member 6 and the resilient compression member 14 for ensuring relatively even application of pressure to the planar end 3 of the object 2.

The elongated tension member may be a wire cable strap, or linked chain, but preferably at least the proximal portion 11 of the elongated tension member 9 is a link chain. An attachment member 17 is connected to the lever member 6 and is formed with an engaging member 18 for releasably engaging selected links 19 in the tension member 9.

Attachment member 17 may be fixedly connected to lever member 6, but preferably it is formed with a clamp member 20 for engaging the lever member at selected points between the hand engageable end 7 and the working end 8.

The elongated tension member 9 may be directly connected to engaging means 13, but as shown in FIG. 1, preferably a turnbuckle 21 is disposed between the distal end 10 of the elongated tension member 9 and the engaging means 13. The turnbuckle is threaded to an eye bolt 22 which is connected to the distal end 10 of the tension member by a coupling link 23. The other end of the turnbuckle is threadably connected to a J-hook member 24.

Referring to FIGS. 1, 2 and 5, the resilient compression member 14 consists of a generally circular rubber or plastic pad affixed to a rigid circular metal member 25. A threaded nut 26 is affixed to the back of the metal member 25 by welding or by a suitable adhesive and a threaded stud member is threaded into the nut.

Various universal joint members may be connected to stud member 27 and a ring member 28 which is a standard hardware item has been found to be suitable. An annular rubber or plastic gasket 29 lines the hemispherical inner wall of the ring member. Referring to FIGS. 1, 4 and 5, the ring member 28 closely registers with ball member 30 mounted on fitting 31 formed with a threaded stud 32. Threaded stud 32 is threadably connected to end member 33 which is connected to the distal end 8 of lever member 6. Where lever member 6 is made of wood, metal band 34 should be placed around the wood end.

Referring again to attachment member 17, shown in FIGS. 1, 2, 3, 4, and 6, the clamp member may consist of a pair of U-bolts 35 having threaded ends 36 which are inserted through openings in a metal plate 37 and secured thereto by threaded nuts 38. Engaging member 18 is preferably a hook which is threaded into nut 39 which is fixedly attached to metal plate 37.

Hand engageable end 7 of lever member 6 may be a standard shovel handle having a cylindrical grip 40 The length of the lever may vary depending upon the mechanical advantage desired.

The above described tool is especially adapted for inserting an object 2 such as a cartridge or fiber bundle into a pressure casing for use in the reverse osmosis process. The end fibers are encased in a resinous composition which forms a tube sheet 42 as shown in FIG. 3. The tube sheet is sealed in the casing by annular rubber or plastic O-ring 43. The cartridge 2 is formed with an opening 46 which receives tube 44 which is inserted through bulkhead 45.

A typical casing and fiber bundle cartridge is further described in U.S. Pat. No. 4,061,574, granted Dec. 6, 1977 to George B. Clark.

The method of loading an easily damaged resilient elongated object 2 having a generally linear longitudinal axis 48 and a planar end 3 into a closely fitting relatively rigid casing 4 of conforming shape having a longitudinal axis coaxial with axis 48 comprises.

(a) mounting the casing 4 securely on a frame 49, (b) placing a substantial portion of the object 2 in casing 4, (c) applying an anchoring force as shown by arrow 50 in FIG. 3 to the casing 4 at an angle 51 to the longitudinal axis 48 of the casing, and (d) applying a moving force as indicated by arrow 54 substantially evenly to a substantial portion of the planar end 3 of object 2 and moving the object relative to the casing a selected linear distance, and (e) directing the moving force substantially parallel and substantially coaxially along the longitudinal axis 48 of object 2 in the direction of arrow 54 throughout the selected linear distance.

The moving force as indicated by arrow 54 is effected by a rotational force applied to grip 40 on tool 1 in the direction shown by curved arrow 52 about a pivot point centered in ball member 30 as shown in FIGS. 3 and 4.

OPERATION OF THE TOOL

Operation of the tool is described with respect to the replacement of a fiber bundle from a casing in a reverse osmosis permeator. Essentially the same steps would be followed, however, for removing other types of easily damaged resilient elongated objects from other rigid casings of closely conforming shape.

The first step in replacing a fiber bundle cartridge is to remove the old fiber bundle cartridge. Air pressure is almost always available at plant installations, and the old cartridge is forced out of the casing by applying air pressure between the distal end 55 of the cartridge and the bulkhead wall 45. The cartridge is moved a sufficient distance out of the casing that a workman can easily slide it out the rest of the way.

As shown in FIG. 3, casing 4 is mounted on frame 49 and object 2 is placed in casing 4 so that only a small portion of the object extends beyond the proximal end 53 of the casing. J-hook member 24 is then placed around the end edge of the distal end 5 of the casing 4 and resilient compression member 14 is placed against planar end 3 of the object 2. The lever member 6 is then placed in the position shown in FIG. 3 which is in a generally vertical position. Clamp member 20 is adjusted, if necessary, so that engaging member 18 is just slightly above the top edge of the casing 4. The tension member 9 is then placed under slight tension and the proper link 19 is then placed over engaging member 18 which in the drawings is a hook so that the tool will be in the vertical position when the tension member is under slight tension.

When the center of compression member 14 is on approximately the longitudinal axis 48 of object 2, the operator grasps grip 40 on the tool and rotates it slowly and evenly in the direction of arrow 52. Object 2 then moves toward distal end 5 of the casing 4 as shown by arrow 54. As the distal end 55 of object 2 moves toward distal end 5 of the casing, tube 44 enters opening 46 in the object member. Rotation of tool 1 in the direction of arrow 52 forces object end 55 into registration with bulkhead 45 as shown in FIG. 4. Planar end 3 of the object member 2 enters the casing and tool 1 terminates its rotation approximately in the position shown in FIG. 4.

After the object member, which in this case is a reverse osmosis cartridge, is in the fully inserted position, the tool is disengaged from the cartridge and a tube sheet screen and a perforated plate (not shown) are placed over end 3. The tool may be used to force the permeate end plate (not shown) into the casing.

In selecting the length of the tension member for a particular application in addition to the selection of a particular chain link 19 to attach to engaging aember 18, turnbuckle 21 may be rotated so as to make a fine adjustment to the length of the tension member.

I claim:

1. A manually operable relatively compact tool for loading an easily damaged resilient elongated cylindrical cartridge object having a generally planar end into a closely fitting relatively rigid cylindrical casing of conforming shape having a proximal end and a distal end from a position in which said planar end is moved from a first position outboard of said proximal end of said casing to a second position inboard of said proximal end of said casing, comprising:

(a) a lever member having a hand engageable end and working end;
    (b) an elongated tension member having a length substantially greater than the length of said lever member and having a distal end and a proximal portion;
    (c) casing engaging means mounted at said distal end of said elongated tension member for releasably engaging said distal end of said casing;
    (d) tension member engaging means selectively mounted on said lever member between said hand engageable end and said working end at a point adapted for positioning said tension member closely adjacent the perimeter of said rigid cylindrical casing and including an offset engaging member providing a releasable pivot engagement with said tension member at a point offset from said lever member;
    (e) a resilient compression member formed with a generally planar face adapted for contact with said planar end of said cartridge object; and
    (f) universal pivot means joining said working end of said lever member and said resilient compression member for ensuring relatively even application of pressure to said planar end of said object.

2. A tool as described in claim 1 comprising:
    (a) at least said proximal portion of said elongated tension member is a link chain;
    (b) said tension member engaging means is formed with a link engaging member for releasably engaging selected links in said proximal portion of aid tension member; and
    (c) said tension member engaging means is selectively located on said lever member and said tension member engaging means is offset from said lever member a sufficient distance so that said tension member does not rest on said cylindrical cartridge while it is being moved from said first position to said second position.

3. A tool as described in claim 2 comprising:
    (a) said tension member engaging means is formed with a clamp member for selectively fixedly and releasably engaging said lever member at selected points between said hand engageable end and said working end.

4. A tool as described in claim 1 comprising:
    (a) a turnbuckle disposed between said distal end of said elongated tension member and said tension member engaging means.

5. A tool as described in claim 1 comprising:
    (a) said resilient compression member consists of a generally circular shape having an area which is equal to a substantial portion of the area of said generally planar end of said resilient cylindrical elongated cartridge.

* * * * *